United States Patent Office 2,935,493
Patented May 3, 1960

2,935,493

COMPOSITION COMPRISING A REACTION PRODUCT OF FORMALDEHYDE AND A COPOLYMER OF ACRYLAMIDE AND AN UNSATURATED BETAINE

Walter H. Schuller, Stamford, and Walter M. Thomas, Noroton Heights, Conn., assignors to American Cyanamid Company, New York, N.Y., a corporation of Maine No Drawing. Application April 20, 1955
Serial No. 502,754

1 Claim. (Cl. 260—72)

This invention involves certain unsaturated ammonium compounds and polymers thereof, and more particularly is concerned with compositions comprising a reaction product of formaldehyde with a particular copolymer of an unsaturated betaine with another monomer, specifically acrylamide.

More particularly the present invention involves the use of a compound embraced by the general formula I
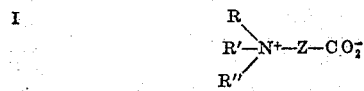

wherein R represents an aliphatic radical containing a terminal $CH_2=C<$ grouping, $R'$ and $R''$ when taken separately each has the same meaning as R and, in addition, an alkyl radical and, when they are jointly taken with the N atom, represent the residue of a heterocyclic tertiary amine, and Z represents an alkylene radical; and to homopolymers and copolymers of compounds of the aforementioned class, which compounds may be designated more specifically as "betaines."

Illustrative examples of radicals represented by R in the above formula, and which comprise preferred subclasses, are radicals represented by the formulas:

II

III

IV

V
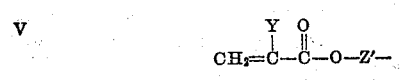

VI
$$CH_2=CH-O-Z'-$$

VII
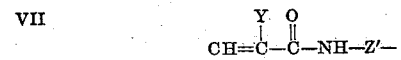

In Formulas II to V and VII, Y represents a member of the group consisting of hydrogen and alkyl radicals, and in Formulas III—VII Z' represents an alkylene radical.

Illustrative examples of alkyl radicals represented by Y in the above formulas are methyl, ethyl, propyl, isopropyl, butyl, isobutyl, sec.-butyl, tert.-butyl, amyl, isoamyl, and hexyl to octadecyl, inclusive. Illustrative examples of alkylene radicals represented by Z in Formula I and by Z' in Formulas III to VII, inclusive, are: methylene, ethylene, propylene, butylene, isobutylene, pentylene, isopentylene, hexylene to octadecylene, inclusive. The alkylene radicals represented by Z and Z' can be either straight or branched chain. Preferably Z and Z' each represents an alkylene radical containing from 1 to 4 carbon atoms, inclusive.

Illustrative examples of heterocyclic radicals represented by $R'$ and $R''$ in Formula I when they are jointly taken with the N atom are morpholinyl, thiamorpholinyl, piperidyl, pyrrolidyl, piperazyl, imidazolyl, pyrazolyl, pyrryl, pyrrolyl, etc. The formulas for these radicals (residues of heterocyclic tertiary amines) just given by way of illustration are as follows:

VIII
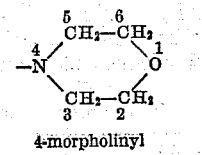
4-morpholinyl

IX
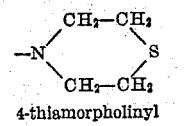
4-thiamorpholinyl

X
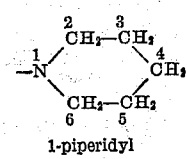
1-piperidyl

XI
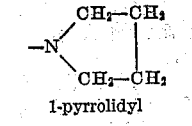
1-pyrrolidyl

XII
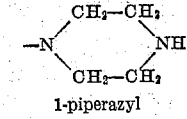
1-piperazyl

XIII
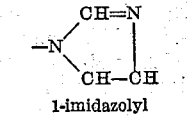
1-imidazolyl

XIV
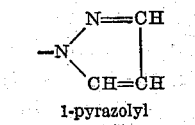
1-pyrazolyl

XV
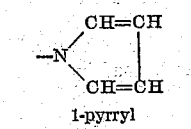
1-pyrryl

XVI
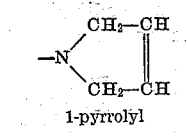
1-pyrrolyl

Additional examples of heterocyclic radicals represented by $R'$ and $R''$ in Formula I when they are jointly taken with the N atom are the C-alkyl (e.g., C-methyl to -octadecyl, inclusive), C-aralkyl (e.g., C-benzyl, C-phenylethyl, C-tolylethyl, C-phenylpropyl, etc.), C-cycloalkyl (e.g., C-cyclopentyl, C-cyclohexyl, etc.), C-aryl (e.g., C-phenyl, C-biphenylyl, etc.) and C-alkaryl (e.g., C-tolyl, C-xylyl, C-ethylphenyl, etc.) derivatives of the aforementioned heterocyclic tertiary-amino radicals given by way of illustration. Such C-substituents can be attached, instead of hydrogen, to any or all of the carbon atoms in Formulas VIII to XVI, inclusive.

Sub-classes of compounds embraced by Formula I are, for instance, the acrylamidopropyl dialkyl carboxyalkylammonium betaines; the triallyl and tri-(methallyl) carboxyalkylammonium betaines; the allyl (and methallyl) dialkyl carboxyalkylammonium betaines; the allyl (and methallyl) dialkyl carboxyalkylammonium betaines; the alkyl diallyl (and di-methallyl) carboxyalkylammonium betaines; and the allyl morpholinyl carboxyalkylammonium betaines. More specific examples include:

Allyl dimethyl carboxyethylammonium betaine
Methallyl dimethyl carboxymethylammonium betaine
Diallyl methyl carboxyethylammonium betaine
Acrylamidopropyl diethyl carboxyethylammonium betaine
Triallyl carboxyethylammonium betaine
Triallyl carboxypropylammonium betaine
Ethallyl dimethyl carboxyethylammonium betaine Other examples will be apparent to those skilled in the art from Formulas I to XVI, inclusive, and from the illustrative examples hereinbefore given of radicals represented by R, R′, R″, Y, Z and Z′.

It is an object of the invention to provide a new class of synthetic compositions, more particularly resinous polymers and copolymers, which are especially suitable for use in the plastics, coating, adhesive, laminating, molding and other arts.

Another object of the invention is the production of new copolymers.

Still other objects of the invention will be apparent to those skilled in the art from the description and examples which follow.

These objects are accomplished, in general, by preparing a betaine of the kind embraced by Formula I and, when desired, polymerizing this compound alone or, preferably, while admixed with another substance which is copolymerizable therewith. The polymerization product advantageously is prepared by polymerizing the polymerizable substance including the aforementioned betaine in an aqueous medium with the aid of a polymerization catalyst, and recovering the resulting polymeric product, if desired, by any suitable means, e.g., by filtration, centrifuging, etc. The polymers (homopolymers and copolymers) are ionic in nature, differing from the ordinary ionic polymer in that they contain both anionic and cationic groupings attached to the polymer chain. It is believed that, at a pH between 1 and 13, neither the anionic nor the cationic grouping is appreciably associated, meaning that the polymer is essentially an internally-neutralized, polymeric salt, the net charge on which should not be influenced by pH within the range stated above.

Any suitable method can be used in preparing the unsaturated betaines embraced by Formula I and which are used in producing the homopolymeric and copolymeric compositions. They can be prepared, for example, by reacting, in an aqueous medium, a tertiary amine represented by the general formula XVII

wherein R, R′ and R″ each has the same meaning given above with reference to Formula I, with an alkali-metal salt (e.g., a sodium, potassium, lithium, etc., salt) of a halogenated carboxylic acid represented by the general formula

XVIII      X—Z—COOH wherein X represents a halogen selected from the class consisting of chlorine and bromine, and Z represents an alkylene radical (numerous examples of which have been given above), preferably an alkylene radical containing from 1 to 4 carbon atoms, inclusive. The reaction is preferably effected under neutral or alkaline conditions (e.g., at a pH of from 7.0 to about 10.0) and a temperature of from about 15–20° C. to about 90–100° C. In some instances it may be advantageous to employ an excess of the tertiary amine. This will result in a higher conversion of the halogenated acid to the betaine. The unreacted amine can then be extracted easily from the aqueous solution of the product.

Illustrative examples of alkali-metal salts of halogenated saturated monocarboxylic acids embraced by Formula XVIII that can be used in producing the betaine are the alkali-metal salts, e.g., the sodium salts, of the following acids:

Chloroacetic
Bromoacetic
Alpha-bromopropionic
Beta-bromopropionic
Alpha-chloropropionic
Beta-chloropropionic
Alpha-bromobutyric
Beta-bromobutyric
Alpha-bromovaleric and other mono-chloro- and mono-bromo-monocarboxylic acids containing, for instance, from 6 to 18 carbon atoms, inclusive.

Any suitable means may be used in effecting polymerization of the unsaturated betaine of this invention, alone or admixed with one or more other substances which are copolymerizable therewith. Heat, light, or both heat and light, with or without a polymerization catalyst can be used. A polymerization catalyst preferably is employed in order to shorten the period of time required for polymerization.

Any of the polymerization catalysts which are suitable for use in polymerizing compounds containing an ethylenically unsaturated grouping, specifically a vinyl grouping, can be employed. Among such catalysts are the various organic peroxy catalysts, illustrative examples of which latter are: the dialkyl peroxides, e.g., diethyl peroxide, dipropyl peroxide, dibutyl peroxide, dilauryl peroxide, dioleyl peroxide, distearyl peroxide, di-(tert.-butyl) peroxide and di-(tert.-amyl) peroxide; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic per-compounds, examples of which are given hereinafter. Other so-called "free radical" types of catalysts, e.g., α,α′-azodiisobutyronitrile, also can be used to accelerate polymerization. The various known "redox" (reduction-oxidation) catalyst systems also can be employed, and are especially adapted for use when the polymerizable substance (monomer alone or admixed with another polymerizable substance) is polymerized in an aqueous medium. Such water-soluble catalyst systems generally comprise a water-soluble catalyst or catalysts and a water-soluble activator. Illustrative examples of water-soluble catalysts are water-soluble, oxygen-yielding peroxy compounds, e.g., the water-soluble peroxides, peracids and persalts, including hydrogen peroxide, organic peroxides, e.g., diacetyl peroxide, urea peroxide, etc., peracetic acid, the various water-soluble perchlorates, persulfates, percarbonates, perborates, perphosphates, etc., e.g., the ammonium and alkali-metal (sodium, potassium, lithium, etc.) salts of percarbonic, peracetic, perboric, perphosphoric, persulfuric, perchloric, etc., acids; water-soluble chlorates, e.g., ammonium, sodium and potassium chlorates, etc.; water-soluble ferric salts capable of yielding ferric ions, including the various ferric alums, e.g., ferric ammonium sulfate (ferric ammonium alum), ferric sodium sulfate, ferric potassium sulfate, etc. Other examples of water-soluble additives comprising a water-soluble catalyst that may be used in producing the polymers (homopolymers and copolymers) of the present invention are given in, for instance, U.S. Patents 2,289,540, 2,380,474, -5, -6, -7, 2,380,617, -8, 2,380,710, 2,383,425, 2,384,544, 2,384,571, 2,384,574, 2,388,373 and 2,395,017.

Illustrative examples of water-soluble activators (water-soluble polymerization adjuvants) of the catalyst are oxygen-containing sulfur compounds which are capable of undergoing oxidation, for instance sulfur dioxide, the alkali-metal (e.g., sodium, potassium, etc.) bisulfites, hydrosulfites, thiosulfates, sulfurous acid (or compounds which engender sulfurous acid, e.g., alkali-metal sulfites, ethyl and other alkyl sulfites, etc.), various organic sulfinic acids, e.g., p-toluene sulfinic acid, formamidine sulfinic acid, etc. If alkali-metal sulfites, e.g., sodium sulfite, or similar compounds which engender sulfurous acid are used, the aqueous solution also should contain a strong acid, e.g., sulfuric acid, etc., in an amount which is at least chemically equivalent to the amount of such a compound engendering sulfurous acid that is employed.

If desired, the polymerizable substance can be polymerized in emulsion or in solution state to yield a polymer. Good results are obtained by effecting polymerization while the polymerizable material is dissolved in a suitable solvent, preferably water or a liquid solvent comprising mainly water. Suitable inert organic solvents can be used if desired, e.g., benzene, toluene, xylene, etc. Preferably the polymerization reaction is carried out in a liquid medium in which the polymerizable substance is soluble but the polymer is insoluble, e.g., water.

The polymerization also can be effected by conventional bulk polymerization technique, in the presence or absence of a solvent capable of dissolving the polymerizable material and in which the latter preferably is inert; or by conventional bead polymerization methods. The polymerization of the polymerizable substance can be effected by a continuous process as well as by a batch operation.

The concentration of the catalyst is relatively small, e.g., from, by weight, about 1 part of catalyst per 1,000 parts of the polymerizable material to about 4 or 5 parts of catalyst per 100 parts of the said material. The amount of polymerization adjuvant or activator used likewise may be varied considerably, but generally is within the range of from about 0.1 to 1 molar proportion based on the catalyst used or an amount which is chemically equivalent to the amount of catalyst employed. The use of higher ratios of activator with respect to the catalyst is not precluded, e.g., 2 or 3 or more moles of activator per mole of catalyst, or correspondingly larger proportions on a chemical equivalent basis, but no particular advantages ordinarily accrue therefrom.

Forms of radiation other than ultraviolet or visible light may also be used to initiate polymerization. Examples of such types of radiation are high-energy particles (e.g., high-energy electrons), X-rays and gamma radiation. Cobalt-60 is a convenient source of gamma radiation. In all of these cases polymerization may be initiated either by direct effect of radiation on the polymerizable substance or indirectly (if a solvent or other substance is present) by the action of radicals resulting from irradiation of these substances.

The polymerization reaction may be effected, if desired, while the aqueous medium is maintained under an atmosphere of an inert gas, for example nitrogen, helium, carbon dioxide, etc.; or, it may be (but preferably is not) carried out under an atmosphere of air.

The temperature at which the polymerizable material is polymerized can be varied over a wide range, up to and including or slightly above the boiling point (at atmospheric pressure) of the monomer or mixture of polymerizable substances. In most cases, the polymerization temperature will be within the range of about 20° or 30° C., preferably at least 35° or 40° C., up to the boiling temperature of the polymerizable material, depending, for example, upon the particular catalyst, if any, used, the rapidity of polymerization wanted and other influencing factors. The use of polymerization temperatures substantially above the boiling point of the monomer or mixture of polymerizable substances is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

The polymers of this invention can be produced in various molecular weights as desired or as conditions may require. Thus, the fiber-forming copolymers, more particularly the fiber-forming acrylonitrile copolymers, ordinarily are within the range of about 15,000 to about 300,000 or higher as calculated from viscosity measurements using the Staudinger equation (reference: U.S. Patent No. 2,404,713). Homogeneous acrylonitrile copolymers having an average molecular weight of between about 60,000 and 90,000 and which contain at least 70%, advantageously from about 80% to about 95% of acrylonitrile (combined acrylonitrile) in the molecule, are especially suitable for use in making dyeable, oriented fibers by wet- or dry-spinning methods.

If the polymerization reaction is carried out while the polymerizable material is dissolved or dispersed in a liquid medium, e.g., in solution in water, the resulting polymer then is separated from the said medium by any suitable means, e.g., by filtration, centrifuging, solvent extraction, etc.

The unsaturated betaine may be used alone in various detergent, germicidal, fungicidal, antistatic, plastics, and other applications. The homopolymer is also useful in many applications, e.g., as a modifier of a polymer of acrylonitrile to improve its dyeability, especially with acid dyes. Or, in order to modify the properties of the unsaturated betaine and to widen the field of utility, it can be copolymerized with other substances which are different therefrom and copolymerizable therewith, e.g., compounds containing a $CH_2=C<$ grouping which are different from the unsaturated betaine; unsaturated alkyd resins; mixtures of individual members of either or both of these classes of polymerizable unsaturated materials; as well as other copolymerizable substances.

Illustrative examples of substances that can be copolymerized with a betaine of the kind embraced by Formula I are vinyl compounds, including the vinyl and isopropenyl aromatic compounds, more particularly the vinyl and isopropenyl aromatic hydrocarbons (e.g., styrene, isopropenyl toluene, the various dialkyl styrenes, etc.), other aliphatic compounds containing a $CH_2=C<$ grouping, e.g., acrylonitrile and the various substituted acrylonitriles (e.g., methacrylonitrile, ethacrylonitrile, phenylacrylonitrile, etc.), the various acrylamides (e.g., acrylamide itself, methacrylamide, ethacrylamide, the N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, the various N-β-hydroxyethyl acrylamides, etc.), vinyl esters, e.g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenylacrylic acid, etc.), more particularly the alkyl esters of an acrylic acid, e.g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

Other examples of copolymerizable substances that can be employed alone or in conjunction with one or more compounds containing a $CH_2=C<$ grouping include the polymerizable unsaturated alkyd resins (modified or unmodified), e.g., ethylene glycol maleate, diethylene glycol maleate phthalate, ethylene glycol maleate succinate and diethylene glycol maleate linoleate. Other and more specific examples of unsaturated alkyd resins that can be used are given, for example, in Nyquist and Kropa Patent No. 2,503,209, dated April 4, 1950, and patents referred to therein (see, for instance, column 8, lines 1–64).

Still other examples of materials that can be copolymerized with the unsaturated betaine of the kind embraced by Formula I are given in Kropa Patent No. 2,510,503 (e.g., column 2, line 46, to the end of the sentence in line 16, column 3; column 5, line 54, through line 46, column 7; and column 13, line 42, through line 30, column 16); and in the aforesaid Nyquist et al. Patent No. 2,503,209 (see, for instance, column 5, line 67, through line 75, column 7; and column 9, line 74, through line 12, column 11).

The proportions of the unsaturated betaine and different unsaturated material which is copolymerizable therewith may be widely varied depending, for instance, upon the particular starting materials employed and the particular properties desired in the copolymer, e.g., in weight ratios of from 1:99 to 99:1, and more particularly from 5:95 to 95:5. Mainly for economical reasons, it is usually desirable that the unsaturated betaine does not exceed about 50% by weight of the total monomers. For example, we may use advantageously from about 1% to about 40% of the betaine and from about 60% to about 99% of the other copolymerizable substance or substances, e.g., a different vinyl compound or compounds, and more specifically acrylonitrile, in producing new and valuable copolymer compositions. The percentages just mentioned are by weight.

Our invention has particular utility in preparing improved acrylonitrile copolymers. In making such copolymers, the proportions of any modifying comonomer or comonomers that are incorporated in the polymerizable composition together with the acrylonitrile and the betaine of the kind embraced by Formula I can be varied as desired or as conditions may require. Ordinarily, however, the acrylonitrile constitutes a major or preponderant proportion (more than 50%) by weight of the total weight of monomers to be copolymerized, the betaine constitutes from about 1–3% to about 15–20%, or in some cases as high as 25 or 30%, of the total weight of the acrylonitrile and betaine, and any modifying comonomer or comonomers (if present in the polymerizable mixture) constitute the remainder of the total amount of copolymerizable ingredients which are subjected to copolymerization.

In the preferred acrylonitrile copolymer compositions (more particularly thermoplastic acrylonitrile copolymer compositions) of the present invention, the acrylonitrile is employed in the mixture of comonomers in an amount such that at least about 85% by weight of combined acrylonitrile is present in the copolymer.

In order that those skilled in the art may better understand how the present invention can be carried into effect the following examples are given by way of illustration and not by way of limitation. All parts and percentages are by weight unless otherwise stated.

EXAMPLE 1

*Preparation of acrylamidopropyl dimethyl carboxymethylammonium betaine*

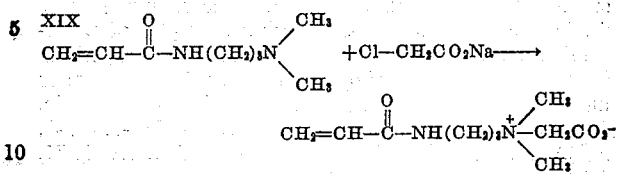

To 52 g. (0.55 mole) of chloroacetic acid in 100 g. of water is added slowly, with cooling and stirring, 22 g. (0.55 mole) of sodium hydroxide pellets dissolved in 100 g. of water. The temperature is held below 20° C. throughout the reaction. This solution of sodium chloroacetate is added dropwise over a 1-hour period to a solution of 78 g. (0.5 mole) of dimethylaminopropylacrylamide in 121 g. of water. Vigorous stirring is employed throughout. The temperature is held at 70–76° C. by means of a hot water bath. A 1.0 ml. aliquot is titrated with N/10 silver nitrate, consuming 8.7 ml. or 74% of the theoretical amount. Heating is continued for another hour at 79–85° C. A 1.0 ml. aliquot then consumes 9.0 ml. of N/10 silver nitrate or 78% of the theoretical quantity. The reaction mass is adjusted to pH 9 with sodium hydroxide and then extracted with two 70 ml. portions of benzene. The aqueous solution containing the product, acrylamidopropyl dimethyl carboxymethylammonium betaine, is found to have an iodine number of 24.7 from which value an "active solids" (betaine monomer) content of 21% is calculated. An aliquot is titrated potentiometrically with standard acid and the absence of any unreacted tertiary amine confirmed.

EXAMPLE 2

*Preparation of allyl dimethyl carboxymethylammonium betaine*

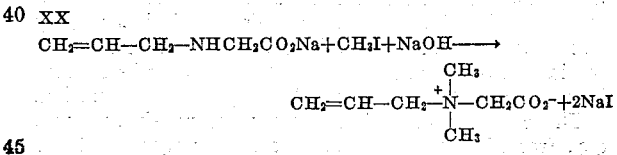

To 101 g. of an aqueous solution containing 0.5 mole of sodium allyl glycinate is added 125 ml. of water and 20 g. (0.5 mole) of sodium hydroxide. The mixture is heated under a Dry-Ice reflux condenser to 42° C. with stirring. Methyl iodide (171 g.; 1.2 moles) is then slowly introduced from a dropping funnel while reflux conditions are maintained by gentle warming on a steam bath. Isopropanol (300 ml.) and ethanol (100 ml.) are added and the mixture refluxed (74–78° C.) for 5 hours. A small additional quantity (25 g.; 0.176 mole) of methyl iodide is added, and the mixture refluxed for an additional 7 hours. The reaction mass containing the product, allyl dimethyl carboxymethylammonium betaine, is stripped on a water pump (pot temperature to 75° C.) to a final volume of 207 ml. Based on the titration curves exhibited by the mixture, the active solids (betaine monomer) content is calculated to be 21%.

Instead of using sodium allyl glycinate as described above, one can use an equivalent amount of other sodium salts of glycinates having attached to the nitrogen atom thereof an unsaturated hydrocarbon radical having a terminal $CH_2=C<$ grouping, e.g., sodium methallyl glycinate, sodium ethallyl glycinate, sodium propallyl glycinate, sodium 3-butenyl glycinate, sodium 4-pentenyl glycinate, sodium phenyallyl glycinate, etc., thereby to obtain the corresponding dimethyl carboxymethylammonium betaines.

Also, instead of using methyl iodide with sodium allyl glycinate or any of the other glycinates mentioned above by way of illustration, one can employ any other alkyl chloride, bromide or iodide, e.g., ethyl to octadecyl, inclusive, thereby to obtain unsaturated betaines having attached to the nitrogen atom thereof two alkyl groups corresponding to the alkyl chloride, bromide or iodide employed.

EXAMPLE 3

*Preparation of diallyl methyl carboxymethylammonium betaine*

XXI

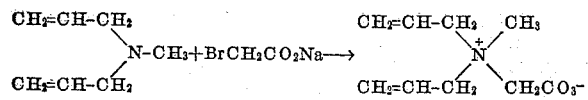

Bromoacetic acid (83.5 g.; 0.6 mole) is dissolved in 50 g. of water, and the resulting solution is chilled to 5° C. in an ice-salt bath. Sodium hydroxide (100 ml. of 6 N solution; 0.6 mole) is added dropwise with stirring and cooling. The temperature is not allowed to rise above 15° C. throughout the addition. To this salt (sodium bromoacetate) solution is added 76.5 g. (0.69 mole) of diallyl methyl amine. Acetone is then introduced until a homogeneous solution is obtained (550 ml. of acetone used). The mixture is allowed to stand at room temperature for ten days. It is adjusted to a pH of 9 and then extracted with benzene to remove all traces of unreacted tertiary amine. The aqueous-acetone solution of betaine contains 3.0% nitrogen, indicating that the solution contains 36.2% by weight of the betaine monomer. A titration of an aliquot with silver nitrate for bromide ion indicates that there is present 0.58 equivalent of bromide, corresponding to a 97% conversion of tertiary amine to betaine. A potentiometric titration with standard acid confirms the absence of any residual tertiary amine.

Instead of diallyl methyl amine one can use an equivalent amount of any other tertiary amine embraced by the general formula

XXII $$R-\underset{\underset{R''}{|}}{N}-R'$$

where R and R' each represents an alkenyl radical having a terminal $CH_2=C<$ grouping (e.g., methallyl, ethallyl, propallyl, 3-butenyl, 4-pentenyl, phenylallyl, etc.), and which may be the same or different, and R'' represents an alkyl radical, e.g., an alkyl radical containing from 1 to 18 carbon atoms, inclusive, thereby to obtain various carboxymethylammonium betaines.

Betaines having carboxyalkyl groups higher than carboxymethyl are obtained by reacting with any of the above-described amines a different halogenated compound; that is, by using, instead of sodium bromoacetate, an equivalent amount of a sodium salt of the bromo, saturated aliphatic, monocarboxylic acid corresponding to the carboxyalkyl group to be introduced into the betaine.

EXAMPLE 4

*Preparation of dimethallyl methyl carboxyethylammonium betaine*

Example 3 is repeated but using 97.8 g. (0.6 mole) of beta-bromopropionic acid instead of 83.5 g. of bromoacetic acid; and 95.9 g. (0.69 mole) of dimethallyl methyl amine in place of 76.5 g. of diallyl methyl amine. The product, dimethallyl methyl carboxyethylammonium betaine, can be converted into new and useful homopolymers and copolymers.

EXAMPLE 5

*Preparation of triallyl carboxymethylammonium betaine*

XXIII

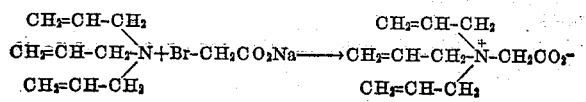

To 68.5 g. (0.5 mole) of triallyl amine, [prepared according to the procedure described by G. B. Butler and B. M. Benjamin, Journal of Chemical Education, 28, 191 (1951)] dissolved in 250 g. of methyl ethyl ketone is added 8.5 g. of (0.5 mole) of sodium bromoacetate plus sufficient water to bring the bulk of the solid into solution (about 15 g.). The mixture is refluxed for 5 hours, 200 ml. of water added, the solution adjusted to pH 9, extracted with two 60 ml.-portions of benzene and the aqueous solution analyzed for bromide ion and total nitrogen content. A potentiometric titration with standard acid confirms the absence of any tertiary amine. The product, triallylcarboxymethylammonium betaine, is useful in the production of homopolymers and copolymers.

The triallyl carboxyalkylammonium betaines higher than the carboxymethyl derivatives are similarly prepared by using a sodium salt of a bromo saturated aliphatic monocarboxylic acid higher than acetic.

EXAMPLE 6

*Preparation of allyl morpholinyl carboxymethylammonium betaine*

XXIV

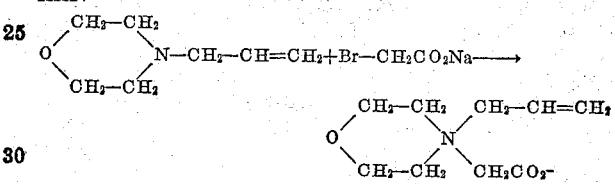

To 63.5 g. (0.5 mole) of N-allyl morpholine dissolved in 200 g. of acetone is added 80.5 g. (0.5 mole) of sodium bromoacetate and sufficient water (about 17 g.) to bring the bulk of the solid into solution. The mixture is allowed to stand at room temperature (20–30° C.) for about 16 hours and is then refluxed for 2 hours. Water (200 ml.) is then added, and the solution extracted with two 60 ml.-portions of benzene after adjusting to pH 9. The resulting aqueous solution is analyzed for total nitrogen content and bromide ion. An aliquot is titrated potentiometrically and the absence of any free amine is thus confirmed.

The morpholinyl carboxyalkylammonium betaines higher than the carboxymethyl derivative are similarly prepared by using a sodium salt of a bromo saturated aliphatic monocarboxylic acid higher than acetic.

EXAMPLE 7

*Homopolymer of acrylamidopropyl dimethyl carboxymethylammonium betaine*

A sample of syrupy acrylamidopropyl dimethyl carboxymethylammonium betaine (produced as described under Example 1) weighing 21.4 g. is dissolved in 180 g. of water, and 0.2 g. of ammonium persulfate is added. The solution is heated on a steam bath for 3 hours during which time the viscosity of the solution progressively increases due to the formation of water-soluble homopolymeric acrylamidopropyl dimethyl carboxymethylammonium betaine. The solution of the homopolymer, with or without dilution with water and with or without the inclusion of other additives, as desired or as conditions may require, is useful, for example, as a beater additive in the production of paper having improved properties, e.g., improved dry-strength characteristics.

Aqueous solutions of the monomeric betaines of Examples 2 to 6, inclusive, also can be polymerized, for instance as described in this example, to yield solutions of the water-soluble homopolymeric betaine that likewise are useful as a beater additive, as well as for other purposes mentioned later herein.

EXAMPLE 8

A reaction vessel is equipped with a stirrer, a reflux condenser, a thermometer, a gas-inlet tube, and three dropping funnels. Funnel A is charged with a mixture containing 80 parts of acrylamide, 91 parts of a 22% aqueous solution of acrylamidopropyl dimethyl carboxymethylammonium betaine (20 parts actual betaine) and 230 parts of water. This monomeric mixture is adjusted to a pH of 2.5 with a few drops of 6 N sulfuric acid. Funnel B is charged with 0.20 part of ammonium persulfate dissolved in 50 parts of water. Funnel C is charged with 0.1 part of potassium meta-bisulfite dissolved in 50 parts of water. The reaction vessel is purged with nitrogen for one hour prior to the start of the copolymerization. The copolymerization is carried out under a nitrogen blanket maintained by introducing a slow, continuous stream of nitrogen into the reaction vessel.

Initially, 20% of the contents of each funnel is added to the reaction vessel with stirring, the constant temperature bath in which the vessel is immersed being held at 40° C. A definite exotherm is experienced but is readily controlled by cooling. Over the next two hours, the contents of the three funnels are added to the vessel in constant ratio and in small increments, at regular intervals. The temperature of the copolymerization is maintained at 40° C. during this period and for three and one-half hours following the last addition. At this point, 500 ml. of water is added, with vigorous stirring. The resulting 10% solution of the copolymer of acrylamide and acrylamidopropyl dimethyl carboxymethylammonium betaine has a pH of 2 and a Brookfield viscosity of 9,000 cps. The iodine value of this solution is 0.25 cg. I/g., indicating the conversion to be better than 99% of total monomers to copolymer.

The copolymer of acrylamide and acrylamidopropyl dimethyl carboxymethylammonium betaine is useful, for instance, as a textile-treating composition or as a component of such compositions. For example, it can be employed in treating wool-containing fabrics and other textiles to impart shrinkage resistance thereto. The formaldehyde- and other aldehyde-reaction products are similarly useful.

The aqueous copolymer solution of this example, and solutions of their aldehyde-reaction, specifically formaldehyde-reaction, products are also useful as, for instance: core binders; components of adhesive and laminating compositions; sealing agents; thickeners; as beater additives to pulp in the production of improved papers having, for example, high dry-strength characteristics; as drilling mud additives; etc.

Instead of the acrylamide used in this example one can substitute for all or any part of it an equivalent amount of another monomer (or mixture of monomers in any proportions) which is different from acrylamidopropyl dimethyl carboxymethylammonium betaine, is copolymerizable therewith and which contains a $CH_2=C<$ grouping, e.g., methacrylamide, ethacrylamide, cyclopentylacrylamide, phenylacrylamide, tolylacrylamide, benzylacrylamide, and the various mono- and di-N-substituted acrylamides, including the mono- and di-N-alkyl, -cycloalkyl, -aryl, -alkaryl, -aralkyl and -alkoxyalkyl acrylamides. In some cases it may be desirable to carry out the reaction in a mixture of water and an organic solvent, for instance a 1:1 volume mixture of water and acetone.

Likewise, instead of the betaine employed in this and the other examples relating to the production of homopolymers and copolymers, one can use any other unsaturated betaine of the kind embraced by Formula I.

EXAMPLE 9

One hundred grams of the 10% copolymer solution of Example 8 is adjusted to pH 10 by the addition of a few drops of 1 N sodium hydroxide, with vigorous stirring. To this solution is added 21.2 g. of a 37% aqueous solution of formaldehyde (formalin) and the mixture heated with stirring for one hour at 55° C. The resulting solution contains a formaldehyde-reaction product of the copolymer of acrylamide and acrylamidopropyl dimethyl carboxymethylammonium betaine. This solution can be adjusted to a suitable pH, as desired or as conditions may require, e.g., a pH of 6.5 to 7.0, and used in such applications as given by way of illustration with reference to the product of Example 8.

EXAMPLE 10

This example illustrates the preparation of homopolymeric acrylonitrile, which is subsequently employed in comparative dye tests with some of the copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of pre-purified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium metabisulfite, each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Büchner funnel, and washed with 1000 parts of distilled water followed by about 160 parts of methanol. The polymer is dried in an oven at 70° C. for about 16 hours. The yield of dry polyacrylonitrile, which is white, amounts to 48 parts.

EXAMPLE 11

The apparatus used is essentially the same as that described in Example 8.

The vessel is charged with 196 g. of acrylonitrile (containing 3% water by weight), 37 g. of a 21% aqueous solution of acrylamidopropyl dimethyl carboxymethylammonium betaine (7.77 g. of actual betaine), 38 ml. of 3 N nitric acid, and 1500 ml. of water. The resulting homogeneous solution exhibits a pH of 1.5. Funnel A is charged with 1.3 g. of sodium chlorate and 4.67 g. of anhydrous sodium sulfite dissolved in 100 ml. of water. Funnel B is charged with a mixture of 25 ml. of 3 N nitric acid and 75 ml. of water. The copolymerization is initiated by the introduction of 40% of the contents of each funnel into the flask, with stirring. During the next two hours the contents of the two funnels are discharged in five portions and in constant ratio, at regular intervals, into the reaction mixture. Heating is continued at 40° C. with stirring for two hours after the final addition. The resulting copolymer of acrylonitrile and acrylamidopropyl dimethyl carboxymethylammonium betaine is filtered off, washed, and dried; yield 160.8 g. (80.4%).

Analysis shows that the copolymer contains 25.2% of total nitrogen. A titration in a nonaqueous solvent system indicates that a minimum of 3.1% of the betaine is combined in the copolymer as compared with 3.93% betaine in the monomeric mixture. This copolymer is converted into a fiber as described in a subsequent example.

EXAMPLE 12

To a reaction vessel are added 9 parts of acrylonitrile, 1 part of triallyl carboxymethylammonium betaine, 90 parts of water and 0.5 part of ammonium persulfate. The solution is warmed on a steam bath for 1 hour. The precipitate is collected on a Büchner funnel, washed with 500 parts of water and dried in an oven at 70° C. for 6 hours. A good yield of dry, white copolymer of acrylonitrile and triallyl carboxymethylammonium betaine is obtained.

EXAMPLE 13

To a reaction flask equipped as in Example 10 is added a solution of 90 parts of acrylonitrile, 8 parts of diallyl methyl carboxymethylammonium betaine (as a 10% aqueous solution), 8 parts of vinyl acetate, 875 parts of demineralized water and 0.17 part of nitric acid. The pH of the solution is 3.2. A rapid stream of pre-purified nitrogen gas is passed over the surface of the solution for 30 minutes. The nitrogen flow is then reduced to about one bubble per second. A reduction-oxidation catalyst system ("redox" system) is prepared by dissolving 0.440 part of sodium chlorate and 1.575 parts of sodium sulfite in 100 parts of water and 1.134 parts of nitric acid in another 100 parts of water. Portions of the catalyst solutions are added at 25-minute intervals over a period of 2.5 hours. The polymerization is continued for a total of 4 hours at 40° C. The polymer is collected on a Büchner funnel, washed with 3000 parts of water and dried in an oven at 70° C. for 5 hours. The yield of dry, white tripolymer of acrylonitrile, diallyl methyl carboxymethylammonium betaine and vinyl acetate amounts to 85 parts.

EXAMPLE 14

This example is essentially the same as Example 13 with the exception that 95.4 parts of acrylonitrile are used instead of 90 parts, 5.3 parts of allyl morpholinyl carboxymethylammonium betaine are used instead of 8.0 parts of diallyl methyl carboxymethylammonium betaine, and 5.3 parts of vinyl acetate are used instead of 8.0 parts. The yield of dry, white tripolymer of acrylonitrile, allyl morpholinyl carboxymethylammonium betaine and vinyl acetate amounts to 88 parts.

EXAMPLE 15

To a reaction vessel equipped as in Example 10 is added a solution of 95.4 parts of acrylonitrile, 5.3 parts of allyl dimethyl carboxymethylammonium betaine (as a 10% aqueous solution), 5.3 parts of acrylamide, 1050 parts of water and 10.6 parts of sodium nitrate. The redox catalyst system is prepared in the same manner as before, using 0.88 part of sodium chlorate, 3.15 parts of sodium sulfite and 2.27 parts of nitric acid. The same polymerization conditions are used as described in Example 8. The yield of dry, white tripolymer of acrylonitrile, allyl dimethyl carboxymethylammonium betaine and acrylamide amounts to 90 parts.

EXAMPLE 16

To a reaction vessel are charged 6 parts of acrylonitrile, 2 parts of allyl dimethyl carboxymethylammonium betaine, 32 parts of water and 0.08 part of potassium persulfate. The solution is heated on a steam bath for 1 hour. The precipitate is collected on a Büchner funnel, washed with 500 parts of water and dried in an oven at 70° C. for about 3 hours. A good yield of dry, white copolymer of acrylonitrile and allyl dimethyl carboxymethylammonium betaine is obtained.

EXAMPLE 17

To a reaction vessel are charged 9 parts of styrene, 1 part of allyl morpholinyl carboxymethylammonium betaine, 30 parts of water, 0.30 part of a cationic emulsifying agent, specifically gamma-stearamidopropyldimethyl-beta-hydroxyethylammonium chloride, and 0.10 part of alpha, alpha'-azodiisobutyronitrile. The emulsion is heated on a steam bath for 2 hours. At the end of this time the emulsion is broken and the precipitated copolymer is collected, washed and dried in the same manner as in Example 16. A good yield of dry, white copolymer of styrene and allyl morpholinyl carboxymethylammonium betaine is obtained.

Instead of the styrene employed in this example, one can use an equivalent amount of, for example, paramethyl styrene, alpha, para-dimethyl styrene, any of the nuclearly substituted dialkyl styrenes, the various chloro- and cyano-substituted styrenes, vinyl naphthalene and other compounds which are different from the unsaturated betaine, are copolymerizable therewith and contain a $CH_2=C<$ grouping, more particularly a single $CH_2=C<$ grouping. Also, in place of allyl morpholinyl carboxymethylammonium betaine one can use an equivalent amount of allyl morpholinyl carboxyethyl-, -propyl-, -butyl- (or higher alkyl) ammonium betaine, or any other betaine of the kind embraced by Formula I.

Emulsion or latices of the copolymer of this example are useful as a component of wall paints, adhesives, and coating and/or impregnating compositions. Such emulsions or latices also can be employed directly for the preparation of various sheets, coatings and elastomeric articles.

EXAMPLE 18

To a reaction vessel equipped with a reflux condenser are charged 9 parts of methyl acrylate, 1 part of acrylamidopropyl dimethyl carboxymethylammonim betaine, 40 parts of water and 0.1 part of potassium persulfate. The solution is refluxed for 1 hour on a steam bath. The product is collected on a Büchner funnel, washed with 250 parts of water and dried in an oven at 70° C. for 3 hours. A good yield of a cream-colored, rubbery copolymer of methyl acrylate and acrylamidopropyl dimethyl carboxymethylammonium betaine is obtained. This copolymer can be used, for instance, as a component of various finishes and sizes (e.g., textile sizes, leather-finishing compositions, etc.), as a modifier of other synthetic resins, as a component of printing pastes, as an intermediate in producing other synthetic materials, and for other purposes.

Instead of methyl acrylate employed in this example, one can use an equivalent amount of any of the other alkyl acrylates and methacrylates, especially the lower alkyl acrylates and methacrylates, e.g., ethyl, propyl, butyl and amyl acrylates, and the methyl to amyl, inclusive, methacrylates; also, the corresponding alpha-chloro acrylates.

EXAMPLE 19

Samples of the homopolymeric acrylonitrile of Example 10 and of the acrylonitrile copolymers of Examples 11–16 are subjected to the following dye test: A sample (5 parts) of the dry homopolymer or copolymer is added to a dyebath consisting of 500 parts of an aqueous solution containing 0.2 part of sulfuric acid, 1 part of sodium sulfate and 0.2 part of Calcocid Alizarine Blue SAPG (Color Index No. 1054). The dyebath is boiled for 30 minutes after which the polymerization product is filtered off and washed with hot water until the water is free of dye. The acrylonitrile copolymers of Examples 11–16, inclusive, are dyed blue whereas the homopolymeric acrylonitrile of Example 10 fails to absorb any dye. The advantage of modifying an acrylonitrile polymerization product by replacing a part (e.g., from about 1% to about 15% or 20% or more, still more particularly from 2% or 3% to 8% or 10%) of the initial acrylonitrile or other monomer with an unsaturated betaine of the kind embraced by Formula I, thereby to obtain a copolymeric substance of improved dyeability, is therefore quite apparent.

EXAMPLE 20

The copolymer of Example 11 is dissolved in a concentrated aqueous solution of sodium thiocyanate (about 50% sodium thiocyanate in water) in proportions such as will yield a spinning solution containing about 9.5% of copolymer. This solution is filtered, placed under vacuum and allowed to deaerate for about 72 hours.

The aforementioned spinning solution is formed into a fiber by extruding it through a spinneret, having 40 holes 90 microns in diameter, into a coagulating bath comprising water maintained at a temperature of about 0° C. The spun fiber in gel state is continuously passed over a pair of converging wash rolls while it is advancing in a helical path. The fiber is rinsed with water on the rolls to remove excess thiocyanate. The washed fiber is stretched about 750% while passing through a bath of hot water maintained at a temperature of about 99.5° C., and then is taken up on a bobbin where it is kept in a gelled state by applying a fine spray of water while the fiber is being collected on the bobbin.

Individual swatches of the gelled fiber are bleached by bringing to a boil in 3% aqueous hydrogen peroxide, followed by water washing, then bringing to a boil in 35% nitric acid, and again washing with water. After drying at room temperature, the bleached swatches are dyed in the same manner as described under Example 19. The fibers are dyed blue. In marked contrast, a fiber similarly prepared from homopolymeric acrylonitrile remains colorless when placed in the same dye bath for the same length of time.

EXAMPLE 21

Same as in Example 20 with the exception that (1) the fiber is made from a copolymer (more particularly a tripolymer) prepared from 90 parts acrylonitrile, 3 parts allyl dimethyl carboxymethylammonium betaine and 7 parts vinyl acetate in essentially the same manner described under Example 13 with reference to the production of a different acrylonitrile copolymer; and (2) the washed fiber is stretched about 850% while passing through the hot water bath. Similar results are obtained.

EXAMPLE 22

The apparatus used is similar to that described in Example 8. The reaction vessel is charged with 28 g. of a 35% aqueous solution of diallyl methyl carboxymethylammonium betaine (9.8 g. of actual betaine) and 720 g. of water, and the solution is adjusted to pH 2.5 with a few drops of 6 N sulfuric acid. Funnel A is charged with 190 g. of acrylamide and 570 g. of water and the solution adjusted to pH 2.5 with a few drops of 6 N sulfuric acid. Funnel B is charged with 1 g. of ammonium persulfate dissolved in 250 ml. of water. Funnel C is charged with 0.5 g. of potassium meta-bisulfite dissolved in 250 ml. of water. The contents of the funnels are added in five portions, in constant ratio to each other, over a one and one-half hour period. Stirring is vigorous and the temperature of the copolymerization is held at 44° C. throughout. Heating is continued at 44° C. for two and one-half hours after the last addition. The resulting solution contains about 10.8% of acrylamide-betaine copolymer solids and has a Brookfield viscosity of 8,800 cps.

EXAMPLE 23

Same as in Example 22 with the following exceptions: The reaction vessel is charged with 84 g. of a 36% solution of diallyl methyl carboxymethylammonium betaine (30.2 g. of actual betaine), and 666 g. of water, and the solution is adjusted to pH 2.5 with a few drops of 6 N sulfuric acid. Funnel A is charged with 170 g. of acrylamide dissolved in 580 g. of water. Funnel B is charged with 1 g. of ammonium persulfate dissolved in 250 ml. of water. Funnel C is charged with 0.5 g. potassium meta-bisulfite dissolved in 250 ml. of water. The Brookfield viscosity of the solution of acrylamide-betaine copolymer (11.2% copolymer solids) is 1,040 cps.

EXAMPLE 24

Same as in Example 22 with the following exceptions: The reaction vessel is charged with 140 g. of a 36% aqueous solution of allyl dimethyl carboxymethylammonium betaine (50.4 g. of actual betaine) and 610 g. of water, and the solution is adjusted to pH 2.5 with a few drops of sulfuric acid. Funnel A is charged with 150 g. of acrylamide and 630 g. of water and the solution adjusted to pH 2.5 with a few drops of 6 N sulfuric acid. Funnel B is charged with 0.75 g. of ammonium persulfate dissolved in 250 ml. of water. Funnel C is charged with 0.373 g. of potassium meta-bisulfite dissolved in 250 ml. of water. The Brookfield viscosity of the solution of acrylamide-betaine copolymer (12.7% copolymer solids) is 1,270 cps.

The acrylamide copolymer solutions of Examples 22-24 are useful, for example, as beater additives to paper pulp in improving the properties (e.g., dry strength) of paper.

EXAMPLE 25

To a reaction vessel equipped as in Example 10 is added 90 g. of acrylonitrile, 5.3 g. of vinyl acetate, 30.3 g. of a 35% aqueous solution of diallyl methyl carboxymethylammonium betaine, 950 ml. of water and 10.6 g. of sodium nitrate. The pH of the solution is 4.2. The vessel is flushed with nitrogen gas and the redox catalyst system is prepared as in Example 13, using 0.88 g. of sodium chlorate, 3.15 parts of sodium sulfite and 12 ml. of 3 N nitric acid solution. Portions of the catalyst solutions are added at 25-minute intervals over a period of 2½ hours. The copolymer is collected, washed and dried as in Example 13. The yield of dry, white tripolymer (ternary polymer) of acrylonitrile, diallyl methyl carboxymethylammonium betaine and vinyl acetate amounts to 85 parts.

A spinning dope is prepared from the above ternary polymer by dissolving 60 g. of the dry polymer in a mixture of 444 g. of a 57.5% aqueous solution of sodium thiocyanate and 66 g. of water. This solution is filtered, deaerated and spun into a fiber as described under Example 19. An oriented fiber, which is readily dyeable (especially with acid dyes), is obtained.

EXAMPLE 26

The copolymer solution of Example 8 is used as a beater additive to paper pulp following the procedure commonly used with other resinous or resin-forming additives. A blank is run at the same time. Each solution has a pH of 4.5. Bleached Northern Kraft pulp is used. The tensile strength and burst values are corrected to 50 lbs. basis weight. The results are tabulated below:

| Composition | Treatment in Order of Addition | Basis Weight, 25 x 40— 500 | Tensile Strength Dry, lb./in. | Strength Wet, lb./in. | Burst, psi. | Strength Increase | |
|---|---|---|---|---|---|---|---|
| | | | | | | Percent Tensile | Percent Burst |
| Copolymer Sol'n | 3% resin, 2% alum. | 47.3 | 28.3 | 1.3 | 56 | 31.7 | 27.2 |
| Blank | 2% alum. | 47.9 | 21.5 | | 44 | | |

It will be understood, of course, by those skilled in the art that our invention is not limited to the specific ingredients named in the above illustrative examples nor to the particular proportions and methods mentioned therein. Variations in starting materials, proportions, methods of preparation, etc., can obviously be made, as has been indicated in the portion of this specification prior to the examples.

Although many of the new copolymers of this invention, especially those containing a substantial proportion of acrylonitrile, are particularly useful in the formation of fibers or filaments which are more amenable to dyeing than homopolymeric acrylonitrile, these and the other copolymers of the invention also have numerous other applications in the plastics and coating arts. For instance, with or without a filler or other additive, they may be used as molding compositions (or as components of molding compositions) from which molded articles are produced by molding the compositions under heat and pressure, e.g., temperatures of the order of 130° C. or 140° C. to 200° C. and under pressures up to 10,000 pounds or more per square inch. Among the fillers that can be employed in the production of molded compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable and polymerized compositions of our invention can be used in many different applications, for example as adhesives; in the treatment, more particularly coating, of paper or paper stock and in other coating applications; and for various other purposes. The polymer can be formed or advanced in situ after application of the monomer or mixture of monomers, or incompletely polymerized polymer, to the base material to be coated, impregnated or otherwise treated. The water-soluble polymers are also useful as agents, or as a component of agents, for preventing soil re-deposition; and as soil conditioners.

The unoriented and oriented fibers produced from our new fiber-forming copolymers are readily dyed, especially with an acid dye, while the fiber is in either a gel (e.g., aquagel) or a dry state. Such fibers or other shaped articles produced from the copolymers also have, in general, better antistatic properties than polymers in which no unsaturated betaine of the kind embraced by Formula I has been incorporated.

The homopolymeric and copolymeric betaines of this invention are a new and useful class of polyelectrolytes having a wide field of industrial applications, numerous examples of which have been given hereinbefore.

We claim:

A composition comprising the substance which is the product of chemical combination under alkaline conditions of (1) formaldehyde with (2) a copolymer of copolymerizable monomers consisting of (a) acrylamide and (b) acrylamidopropyl dimethyl carboxymethylammonium betaine having the formula

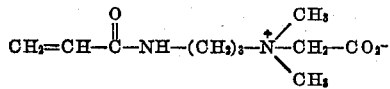

the betaine of (b) constituting from about 1% to about 40% by weight of the total amount of (a) and (b).

References Cited in the file of this patent

UNITED STATES PATENTS

| | | |
|---|---|---|
| 2,082,275 | Daimber et al. | June 1, 1937 |
| 2,548,428 | Fiedarek | Apr. 10, 1951 |
| 2,563,289 | Steinman | Aug. 7, 1951 |
| 2,595,575 | Ham | May 6, 1952 |
| 2,744,130 | Winberg | May 1, 1956 |
| 2,777,872 | Shacklett | Jan. 15, 1957 |
| 2,834,758 | Shacklett | May 13, 1958 |

FOREIGN PATENTS

| | | |
|---|---|---|
| 716,322 | Germany | Jan. 22, 1943 |

OTHER REFERENCES

Whitmore: Organic Chemistry, page 594, Van Nostrand 11937. (Copy in Library.)

UNITED STATES PATENT OFFICE
CERTIFICATE OF CORRECTION

Patent No. 2,935,493                        May 3, 1960

Walter H. Schuller et al.

It is hereby certified that error appears in the printed specification of the above numbered patent requiring correction and that the said Letters Patent should read as corrected below.

Column 3, lines 6 and 7, strike out "the allyl (and methallyl) dialkyl carboxyalkylammonium betaines;"; column 9, line 7, in the italicized heading to EXAMPLE 3, for "dially" read -- diallyl --; lines 10 to 13, the right-hand portion of the formula should appear as shown below instead of as in the patent:

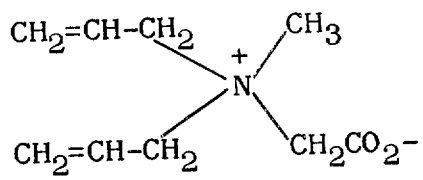

same column 9, line 60, for "97.8 g." read -- 91.8 g. --; column 14, line 11, for "Emulsion" read -- Emulsions --; columns 15 and 16, in the table, the headings to columns 4 and 5 thereof should appear as shown below instead of as in the patent:

| Tensile Strength | |
| --- | --- |
| Dry, lb./in. | Wet, lb./in. |

Signed and sealed this 18th day of October 1960.

(SEAL)
Attest:

KARL H. AXLINE
Attesting Officer

ROBERT C. WATSON
Commissioner of Patents